April 3, 1928.
L. F. KORNS
1,664,748
INDIRECT LIGHTING SYSTEM FOR MOTOR VEHICLES
Filed Aug. 2, 1927 2 Sheets-Sheet 1
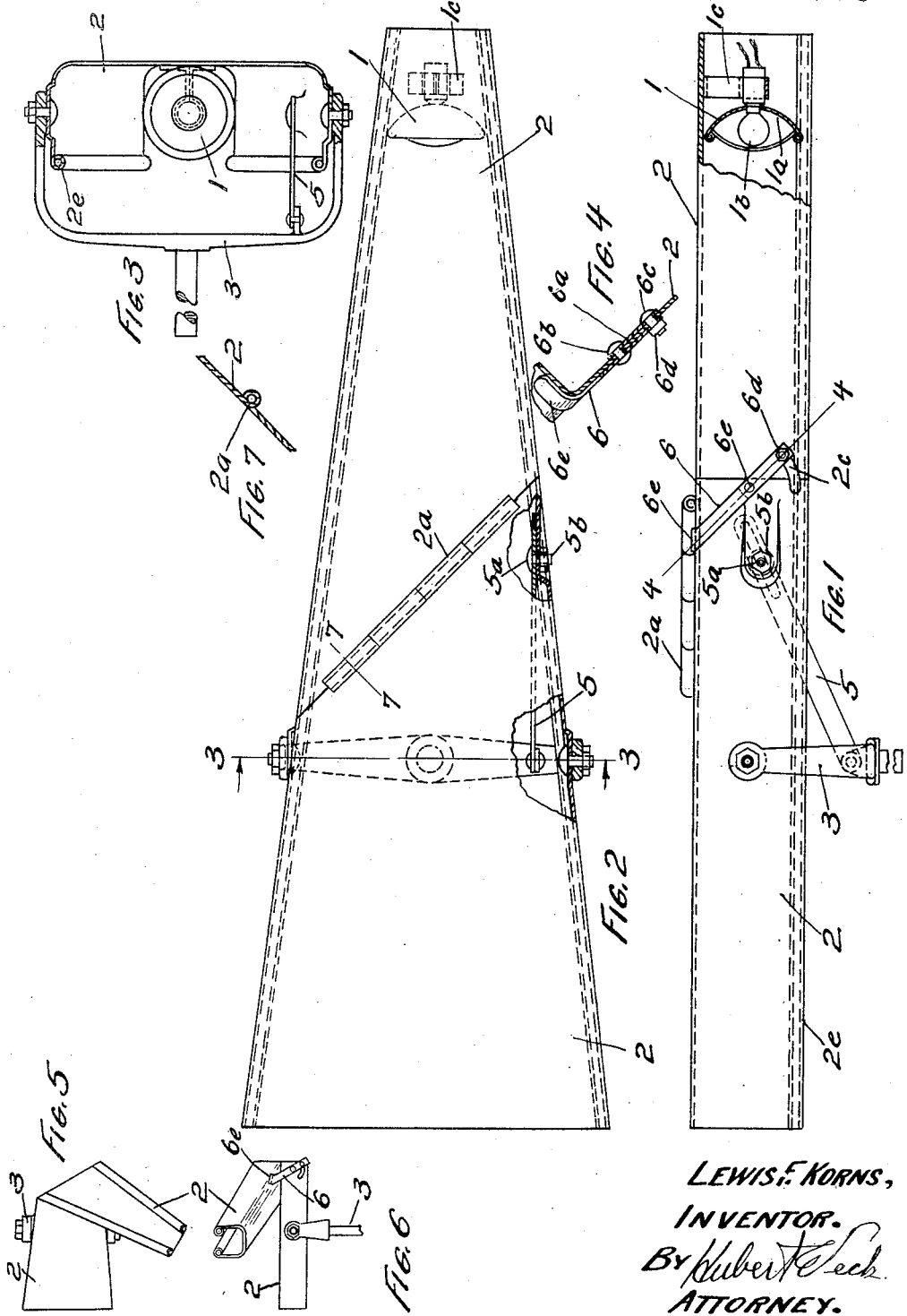
LEWIS F. KORNS,
INVENTOR.
ATTORNEY.

April 3, 1928.  
L. F. KORNS  
1,664,748  
INDIRECT LIGHTING SYSTEM FOR MOTOR VEHICLES  
Filed Aug. 2, 1927  2 Sheets-Sheet 2
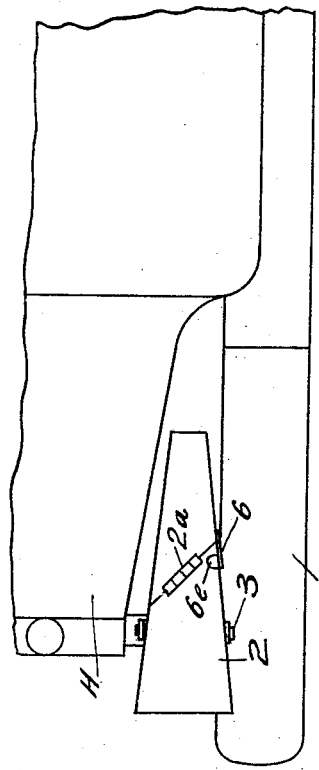
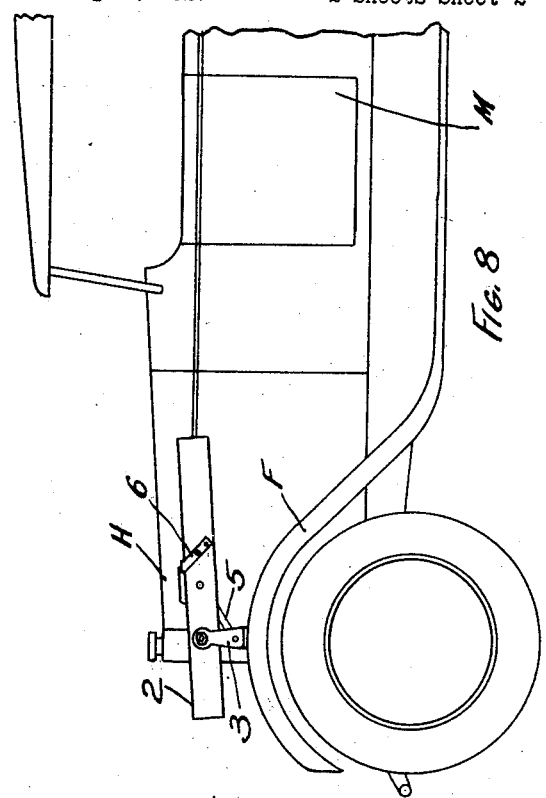
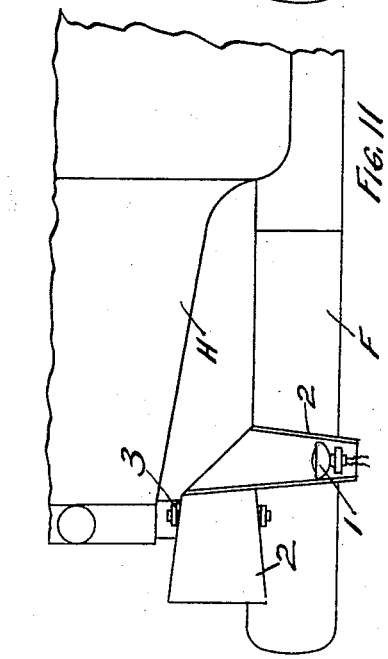
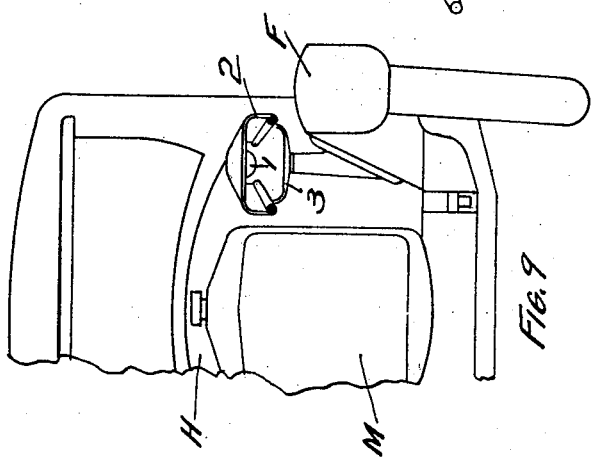
LEWIS F. KORNS,
INVENTOR
By Hubert Peck
ATTORNEY.

Patented Apr. 3, 1928.

1,664,748

UNITED STATES PATENT OFFICE.

LEWIS F. KORNS, OF MINNEAPOLIS, MINNESOTA.

INDIRECT LIGHTING SYSTEM FOR MOTOR VEHICLES.

Application filed August 2, 1927. Serial No. 210,074.

This invention relates to certain improvements in indirect lighting systems for motor vehicles; and the nature and objects of the invention will be readily recognized and understood from the following description and explanation of the accompanying drawings illustrating what I at present consider to be the preferred embodiment or mechanical expression of the invention from among various other forms, arrangements, combinations and constructions, of which the invention is capable within the spirit and scope thereof.

An object of the invention is to provide a lighting system for motor vehicles by which the road including the sides and the gutters thereof, as well as the running board of the vehicle itself will be completely flooded with light, without the source of this light, or direct rays therefrom being visible at any time to the occupants of an approaching vehicle, so as to thereby eliminate the problem of glare and the blinding of approaching drivers, while at the same time, completely and amply illuminating the road both as to width and distance in advance of the vehicle.

A further object of the invention is to provide a head light for a motor vehicle which is so designed, arranged and mounted on a vehicle that the light rays can be directed on to the vehicle motor with the hood raised, so as to enable and assist in making repairs or adjustments to the motor.

Another object of the invention is to provide a light for motor vehicles having the foregoing characteristics, which light is of simple construction and arrangement readily manufactured and capable of efficient operation in mounted position on a vehicle.

With the foregoing and certain other objects and results in view, which other objects and results will be readily recognized by those skilled in the art from the following explanation, the invention consists in certain novel features in construction and in combinations and arrangements of elements, as will be more fully and particularly referred to and specified hereinafter.

Referring to the accompanying drawings, in which similar reference characters refer to corresponding parts throughout the several figures thereof:

Fig. 1, is a view in side elevation of a light embodying features of the invention, with a portion thereof broken away to show the lamp or light force.

Fig. 2, is a view in top plan of the light shown in Fig. 1.

Fig. 3, is a transverse sectional view taken on the line 3—3 of Fig. 2.

Fig. 4, is a sectional view taken on the line 4—4 of Fig. 1, and showing particularly the arrangement of the clamping means for the pivoted rear section of the light.

Fig. 5, is a view in top plan showing the rear or lamp carrying section swung upwardly to position for directing light on to a vehicle motor, as well as in position to permit raising of the motor hood.

Fig. 6, is a view in side elevation of the light as shown by Fig. 5.

Fig. 7 is a sectional view taken on the line 7—7 of Fig. 2.

Fig. 8, is a view in side elevation of the forward or motor end of a motor vehicle with a light of the invention mounted in operative position thereon.

Fig. 9, is a view in front elevation of the motor vehicle and light of Fig. 8.

Fig. 10, is a top plan view of the vehicle and light of Figs. 8 and 9.

Fig. 11, is a top plan view of the vehicle and lights of Figs. 8 and 9, but with the lamp carrying or rear section of the light swung to position, permitting raising of the hood and the illumination of the vehicle motor.

A form and adaptation of a light and system thereof is disclosed in the accompanying drawings purely by way of example and not of limitation, for the purposes of explaining and describing the invention so as to enable those skilled in the art to understand the same. It will be obvious that the lights of the invention as well as their mounting and arrangement on a motor vehicle can be varied and take other forms, constructions and arrangements, while retaining the principles and features of the invention.

According to the example hereof, referring now to Figs. 1 to 7 in particular of the drawings, the motor vehicle light includes a main shade or light directing and reflecting shield 2 which is in the form of an inverted and tapered trough U-shaped in cross section, so that the ends and underside thereof are open. At the reduced or small end of the shield 2, a suitable source of light such as the lamp 1 of the spot light type, having a forwardly directed reflector $1^a$ and bulb $1^b$, is mounted and supported in any desired manner, as by the support or bracket $1^c$. At an intermediate point a suitable U-shaped or bifurcated bracket or supporting member 3 is provided between the arms of which the reflecting shield 2 is pivotally mounted to permit of vertical swinging and adjustment of the light when in mounted position on this bracket, as will be readily understood. A brace member 5 is pivotally mounted at one end to the bracket 3 and extends rearwardly and upwardly to a side of the reflecting shield 2. The upper end of brace 5 is longitudinally slotted and receives a bolt $5^a$ on the inner side of the shield side wall, which bolt extends outwardly through this wall, and is provided with a clamping nut $5^b$. By this arrangement, the light shield 2 can be swung on bracket 3 to the desired position with nut $5^b$ loose, and then by clamping this nut, the brace 5 will maintain shield 2 in adjusted position.

A further feature of the invention divides the light reflecting shield 2 into forward and rear sections, so that the rear lamp carrying section can be swung upwardly and downwardly to position over and above the forward bracket supported section. This is accomplished by transversely and diagonally dividing the shield 2 to the rear of supporting bracket 3 and then pivotally joining these sections by the hinge $2^a$ at and pivotally joining the adjacent edges of the sections across the upper or top wall of this shield as will be clear by reference to Figs. 1 and 2 of the drawings. In this manner, the rear lamp carrying portion or section of shield 2 can be swung upwardly and forwardly over the bracket supported forward portion of the shield, and due to the diagonal hinge, the lamp carrying section will swing downwardly into position extending laterally and outwardly of the bracket supported section, as clearly shown in Figs. 5, 6 and 11.

An arrangement for clamping and securing the lamp carrying rear portion or section of shield 2 in normally lowered position, and for supporting this lamp carrying section in position swung upwardly over and extending laterally from the bracket supported section, is provided. In the form hereof, a lever 6, referring now to Figs. 1 and 4 of the drawings, is pivotally mounted by means of a rivet or the like $6^b$ to the outer side wall of the forward bracket supported section of shield 2 adjacent the rear edge thereof and this lever in normal position extends upwardly and forwardly of the shield and terminates at its upper end in the shoulder $6^e$ extending a distance inwardly over the top wall of shield 2, forwardly of and adjacent the hinge $2^a$. The lever 6 extends downwardly and rearwardly a distance over and across the adjacent side wall of the rear lamp carrying section, and a short link or lever $6^a$ is pivotally mounted at one end to the rivet $6^b$ on the inner side of the side wall of shield 2 and extends downwardly and rearwardly over the inner side of the side wall of the lamp carrying section of shield 2, and terminates substantially co-extensive with the rearwardly extending portion of lever 6. An arcuate slot $2^c$ is formed through the side wall of shield 2 and extends across the meeting edges of the side walls of the forward and rear shield sections (see Fig. 1). A clamping bolt $6^c$ extends through link $6^a$ and the lower end of lever 6, and this bolt is slidably or movably received in and extends through the slot $2^c$, so that the side wall of shield 2 is disposed between lever 6 and link $6^a$. With this arrangement the rear lamp carrying section of shield 2 can be securely, rigidly clamped in lowered position in operative continuation of the forward bracket supported section to form the light shield, by swinging lever 6 forwardly on pivot $6^b$ to swing the lower or rear end of lever 6 with link $6^a$ upwardly and rearwardly into the portion of the slot $2^c$ in the lamp carrying section of the shield, and then tightening nut $6^d$ on the clamping bolt $6^c$ (see Fig. 2).

In the foregoing position, lever 6 is secured at an intermediate point thereof by rivet $6^b$ to the forward section of the shield and extends across and is securely fixed to the rear section of the shield by the clamping bolt $6^c$ and nut $6^d$. To swing the lamp carrying section of shield 2 upwardly and downwardly on hinge $2^a$, the clamping bolt $6^c$ is released and the lower end of lever 6 with the bolt is swung forwardly to position the bolt in that portion of slot $2^c$ in the forward bracket supported section of the shield, that is, removed from the lamp carrying section and with the shoulder $6^e$ of lever 6 moved rearwardly and to a position slightly above hinge $2^a$ (see Fig. 6). The rear lamp carrying section is thus released and can be freely swung on hinge $2^a$ upwardly and then downwardly on to the forward section of the shield, extending laterally and outwardly therefrom, and received on and supported by the shoulder $6^e$ at the upper end of lever 6. When in this position, this rear section will direct light rays inwardly of the light transversely of the forward section of the shield.

The lower edges $2^e$ of the trough like light reflecting shield 2 are rolled or bent into tubular form for strengthening and other reasons, and at the rear end of the forward bracket supported section of the shield, dowels or pins $2^d$ are provided in these rolled edges 2ᵉ to project rearwardly therefrom and be received into the forward ends of the tubular edges 2ᵉ of the rear lamp carrying section of the shield. The dowels or pins 2ᵈ aid and insure proper alining of the sections, as well as maintaining them in rigid connected position.

A motor vehicle light designed and constructed as above described, referring now to Figs. 8 to 11 of the drawings, is mounted in horizontally disposed position on a motor vehicle M by means of the bracket 3 in the usual manner, and is disposed between a vehicle fender F and the motor hood H, a light of the invention being so mounted at each side of the motor in the usual manner. When so mounted, the light reflecting shields 2 are adjusted by means of the braces 5 at a slightly forwardly and downwardly inclined angle to a position where the forward end of the shield will obscure the lamps 1 from the view of an approaching driver, thus eliminating blinding of such driver and all direct rays and glare. Due to the trough like form of the shields 2, the road for a required distance in advance is flooded with light, while the gutters or sides of the road are likewise completely illuminated due to the tapering form of the light shields with the forward enlarged ends. Also the sides and running boards of the motor vehicle will be illuminated with the several advantages resulting therefrom.

When it is desired to raise the motor hood H on one side or the other of the vehicle M, the rear lamp carrying section of the shield 2 is swung on hinge 2ᵃ to the position shown in Fig. 11, lever 6 and the clamping bolt 6ᶜ being operated as hereinbefore described. In this position of the rear section of the shield 2, the hood H can be raised and when so raised the lamp 1 is positioned facing the motor and by the shield section the rays will be directed on to and completely illuminate the motor, thereby permitting adjustments and repairs being made, even at night without the use of auxiliary lights when such may be available.

By motor vehicle lights embodying the principles and features of the invention as explained hereinbefore, a system of lighting the roadway and portions of the vehicle is provided which is indirect to prevent glare and blinding of approaching drivers, yet which is capable of completely and fully illuminating the roadway in advance and at the sides of the vehicle. The lamp structure and mounting are simple and permit of lights being mounted and installed on motor vehicles of the conventional types in general use without requiring any major reorganization in design or reconstruction. The lights can be readily cheaply manufactured and are efficient and durable under all conditions of operation and use, with the added distinct advantage of serving as a trouble light for illuminating the motor or adjacent parts of the vehicle when necessity so demands.

It is also evident that various other changes, substitutions, variations, modifications, might be resorted to without departing from the spirit and the scope of my invention, and hence I do not wish to limit myself to the exact and specific disclosures hereof.

Desiring to protect my invention in the broadest manner legally possible, what I claim is:

1. In a vehicle light, an inverted, trough like light reflecting shield formed in pivotally connected sections, a lamp mounted on one of said sections for directing light longitudinally of the shield, and the lamp carrying section swingable upwardly and downwardly to position above the other of said sections.

2. In a vehicle light, an inverted, trough like light reflecting shield formed in longitudinally alined sections pivotally connected on an axis transverse of the shield, a lamp mounted in one of said sections for directing light longitudinally of the shield, the lamp carrying section swingable upwardly and then downwardly into position over the other section, and means for clamping said sections together in alined shield forming relation.

3. In a vehicle light, an inverted, trough like light reflecting shield formed in longitudinally alined sections pivotally connected on an axis transverse of and diagonally disposed with respect to the shield, a lamp mounted in one of said sections for directing light longitudinally of the shield, and the said lamp carrying section swingable upwardly and downwardly to position over and disposed transversely of the other of said sections.

4. In a vehicle light, an inverted, trough like light reflecting shield formed in longitudinally alined sections pivotally connected on an axis transverse and diagonal of the shield, a lamp mounted in one of said sections for directing light longitudinally of the shield, said lamp carrying section swingable upwardly and downwardly to position over and disposed transversely of the other of said sections, and means for securing said sections in alined shield forming position, the said means providing a support for the lamp carrying section in position over the other section.

5. In a vehicle light, an elongated light reflecting shield formed in pivotally connected sections, a lamp mounted in one of said sections, and the lamp carrying shield section swingable to position for directing light laterally with respect to the other section.

6. In a vehicle light, an elongated light reflecting shield formed in longitudinally alined sections pivotally connected on an axis transverse of the shield, a lamp in one of said sections for directing light longitudinally of the shield with the sections alined, and said lamp carrying section swingable to position for directing light laterally of the other of said sections.

7. In combination with a motor vehicle, a light therefor embodying, an inverted, trough like light reflecting shield substantially horizontally disposed along and adjacent the motor hood, said shield formed of pivotally connected longitudinally alined front and rear sections, a lamp in the rear section for directing light forwardly through the shield with the sections alined, and the rear section swingable to position for directing light from the lamp carried thereby laterally of the forward section and inwardly toward the motor hood.

8. In combination with a motor vehicle and the hood thereof, a light therefor embodying, an inverted trough like light reflecting shield substantially horizontally disposed along and adjacent the motor hood, said shield decreasing in width rearwardly and formed in pivotally connected alined sections, a lamp mounted at the reduced end of the rear section, said rear section swingable to position disposed across the forward section for directing light from the lamp carried thereby inwardly toward the motor hood.

9. In combination with a motor vehicle, a light therefor embodying, an inverted trough like light reflecting shield mounted longitudinally of the vehicle and swingable on a horizontal axis to adjusted positions, said shield decreasing in width rearwardly, and a lamp mounted at the rear reduced width end of said shield for directing light forwardly through the shield to the forward enlarged end thereof.

10. In combination with a vehicle, lights therefor mounted at opposite sides thereof adjacent the forward end thereof, each of said lights embodying an inverted, trough like light reflecting shield disposed longitudinally of the vehicle and mounted for vertical swinging on a horizontal axis to raise and lower the forward end thereof to adjust the same, means for securing said shields in adjusted positions, the said shields decreasing in width rearwardly, and a lamp mounted at the rear reduced end of each shield for directing light forwardly through the forward enlarged end thereof, and the said shields permitting passage of light downwardly thereof along the sides of the vehicle.

11. In a vehicle light, an inverted, trough-like light reflecting shield formed in sections, a lamp mounted on one of said sections for directing light longitudinally of the shield, and the said lamp carrying section movable to position for directing light laterally with respect to the other of said sections.

12. In a vehicle light, a light reflecting shield formed in sections, a lamp mounted on one of said sections for directing light through the shield, and the said lamp carrying section movable on the other section to position thereon for directing light laterally with respect to the said other section.

Signed at Minneapolis, Minnesota, this 23d day of July, 1927.

LEWIS F. KORNS.